(No Model.)
H. HAGON.
NUT LOCK.
No. 535,828. Patented Mar. 19, 1895.
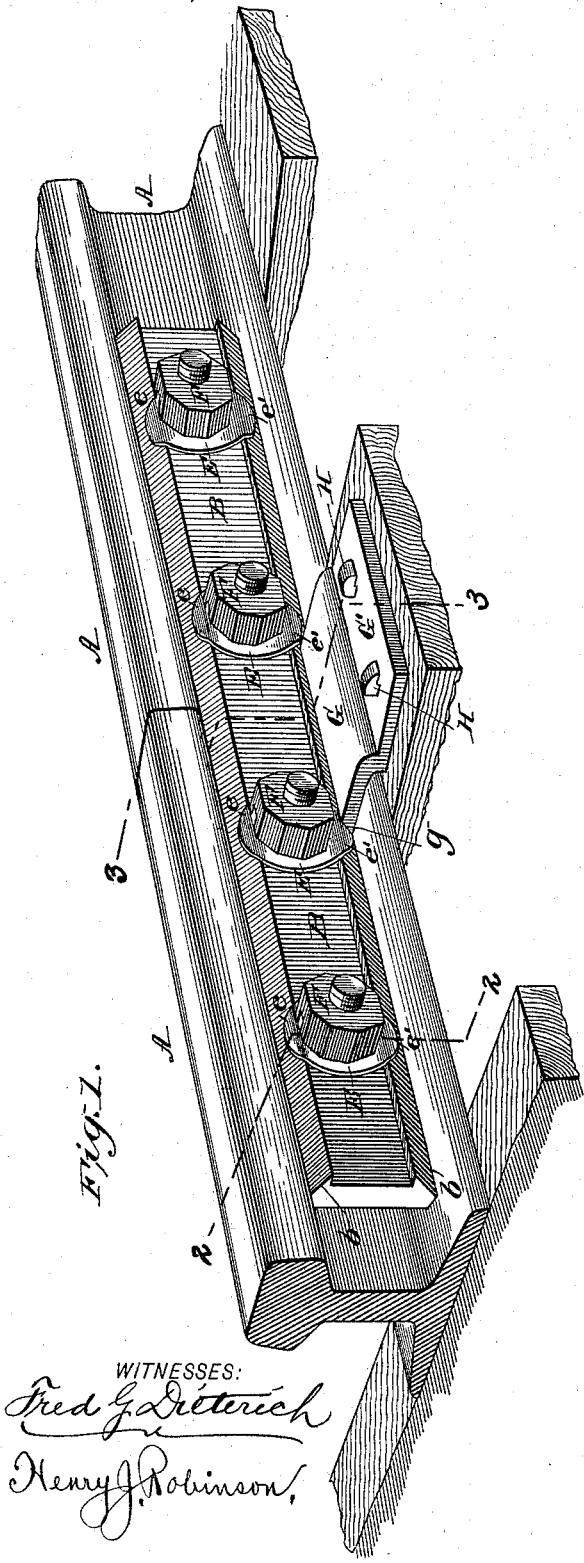
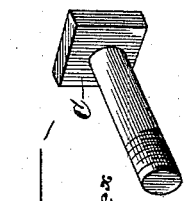
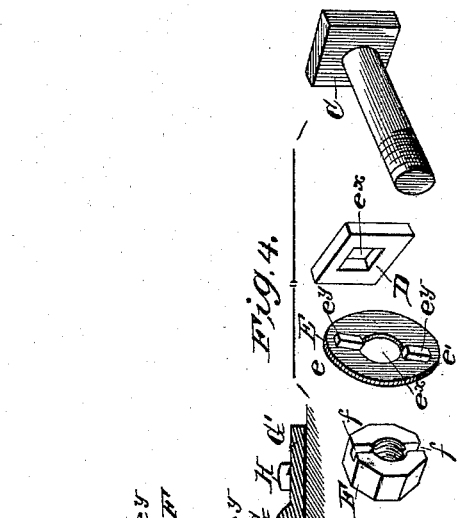
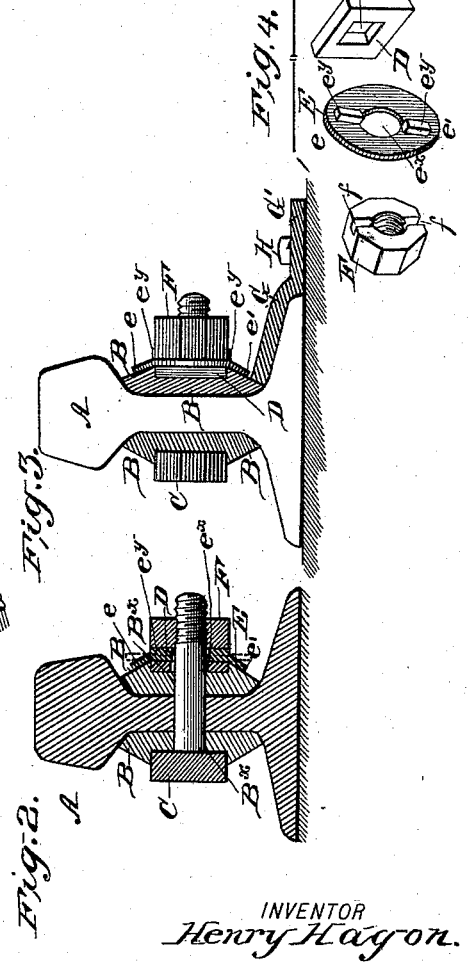
WITNESSES:
Fred G. Dieterich
Henry J. Robinson
INVENTOR
Henry Hagon.
BY Munn & Co.
ATTORNEYS.

UNITED STATES PATENT OFFICE.

HENRY HAGON, OF WEST SUPERIOR, WISCONSIN.

NUT-LOCK.

SPECIFICATION forming part of Letters Patent No. 535,828, dated March 19, 1895.

Application filed June 22, 1894. Serial No. 515,398. (No model.)

*To all whom it may concern:*

Be it known that I, HENRY HAGON, residing at West Superior, in the county of Douglas and State of Wisconsin, have invented certain new and useful Improvements in Nut-Locks, of which the following is a specification.

My invention relates to improvements in nut locks and it primarily has for its object to provide a simple and effective means for joining the ends of the rails and for holding the several connecting parts from becoming detached through the jarring or vibratory action of the rail.

With other objects in view, which hereinafter will appear, my invention consists in the peculiar combination and novel arrangement of parts, as will be first described in detail and then be specifically pointed out in the appended claims, reference being had to the accompanying drawings, in which—

Figure 1 is a perspective view of my improved nut locking devices. Fig. 2 is a cross section of the same taken on the line 2—2 Fig. 1. Fig. 3 is a similar view on the line 3—3 Fig. 1. Fig. 4 illustrates in perspective one of the bolts and lock nut devices therefor.

Referring to the accompanying drawings, A A indicate the rail sections which are of the usual construction, and B B the fish plates which fit with their lower edge against the rail flange or base, while the upper edges abut the under face of the tread portion. The front faces of such upper and lower edges are beveled as shown at $b\ b$ for a purpose presently explained.

The front face of each of the fish plates has a central longitudinal groove $B^x$ in which at one side fit the squared heads of the lock bolts C, while in the other side or plate is seated a square washer D fitted over the bolt, which forms a seat or bearing for the lock washer E. This lock washer it will be noticed is somewhat larger in diameter than the front or grooved portion of the fish plates, whereby its upper and lower edges $e\ e'$ will project over the flanged portions of the fish plates when the nut F is screwed home as shown in dotted lines in Fig. 2, such plates having a central non-threaded aperture $e^x$ and projecting ribs or portions $e^y$ on the front face, which when the several parts are assembled seat in transverse depressions or channels $f$ in the back of the nut F as shown.

So far as described it will be seen that as the nut is fitted with its channel onto the washer E, such washer will be forced against the square washer as the nut is screwed home. When so adjusted the ends $e$ and $e'$ are bent back onto the flanges $b\ b$, as shown most clearly in Fig. 2, and as the said washer is held in a rigid locked engagement with the nut, it follows that when such ends $e$ and $e'$ are bent over the fish plate and nut will be held from becoming unlocked or loosened through the vibrations of the rail, and as the bolt has a squared head fitting the recesses or channel in the fish plate member at its corresponding side, such bolt will be securely held from working loose. The lower beveled edge of the fish plates is also utilized as a seat against which the inner beveled edge $g$ of the grip or flange members G bear, such flanges having extensions or base members G' which are adapted to seat on the tie at the juncture of the two rail sections, and are secured thereto by the spikes H as shown. By this construction the fish plates will always be held tightly up against the under face of the rail tread which will thereby hold such fish plate from vertical vibrations.

From the foregoing description taken in connection with the drawings, it will be readily seen that by securing the fish plates to the rails and bracing the fish plates by the grip flanges or members as shown the vibration and jar on the rail can never move the several parts out of position, making it impossible to raise one above the other, thereby stopping the jumping of the car wheels while passing over the joints.

Having thus described my invention, what I claim, and desire to secure by Letters Patent, is—

1. In a nut lock substantially as described the combination with the rails A, the fish plates B B having a central longitudinal groove, of the bolts C having squared head portions fitting the groove in the fish plate at one side, a washer fitting on the bolt, and in the groove on the opposite fish plate, an apertured washer plate having ribs on its front face and the nut having a channel to fit on the ribs all arranged substantially as shown and described.

2. In a nut lock substantially as described, the combination with the rails A A, the fish plates having upper and lower beveled edges and the bolts, of the washer plates E fitted on such bolts, having their upper and lower edges projected beyond the beveled edges of the fish plates whereby they can be bent thereover, and provided with a rib or projecting portion on the front face, and the nut having a channel on its rear face to receive such rib or projection all arranged substantially as shown and described.

3. In a nut lock the combination with the rails A A, the fish plates B having each a longitudinal groove in the front face and beveled upper and lower edges, and the bolts C having squared heads fitting the groove in the fish plate at one side, a squared washer fitted on the bolts and seated in the groove in the opposite fish plate, the washers E having their upper and lower edges bent over the beveled edges of the adjacent fish plate and having projecting ribs on the front face and the nuts having channels to receive the said ribs all arranged substantially as shown and described.

HENRY HAGON.

Witnesses:
C. R. FRIDLEY,
WM. KENNEDY.